United States Patent
Okano et al.

[11] Patent Number: 6,137,937
[45] Date of Patent: Oct. 24, 2000

[54] AUTOSTEREOSCOPIC IMAGE APPARATUS

[75] Inventors: Fumio Okano; Haruo Hoshino; Jun Arai; Tomoyuki Mishina, all of Tokyo, Japan

[73] Assignee: Nippon Hoso Kyokai, Tokyo, Japan

[21] Appl. No.: 09/226,211

[22] Filed: Jan. 7, 1999

[30] Foreign Application Priority Data

Apr. 27, 1998 [JP] Japan .................................. 10-117355

[51] Int. Cl.$^7$ ...................................................... G02B 6/06
[52] U.S. Cl. ............................................. 385/116; 385/115
[58] Field of Search ..................... 385/115–119; 359/462

[56] References Cited

FOREIGN PATENT DOCUMENTS

| 9-43539 | 2/1997 | Japan . |
| 10-150675 | 6/1998 | Japan . |

*Primary Examiner*—James Phan
*Attorney, Agent, or Firm*—Antonelli, Terry, Stout & Kraus, LLP

[57] ABSTRACT

An autostereoscopic image apparatus for picking-up an autostereoscopic image and optically transmitting and displaying the autostereoscopic image. The autostereoscopic image apparatus is constructed by an assembly of a plurality of optical fibers each having an equal length and a lens function. The length of each of a plurality of optical fibers is equal to a length that is integer times as long as one period of an optical path in the optical fiber. The first edge surface of each of a plurality of optical fibers is located on the same plane and forms the first edge surface of the optical fiber assembly. The second edge surface of each of a plurality of optical fibers is located on the same plane and forms the second edge surface of the optical fiber assembly. An arrangement at the first edge surface of the optical fiber assembly at the edge surfaces of a plurality of optical fibers and an arrangement at the second edge surface are equal. An object is picked-up on the first edge surface side of the optical fiber assembly. The picked-up image is transmitted to the second edge surface of the optical fiber assembly and is displayed on the second edge surface side of the optical fiber assembly.

9 Claims, 6 Drawing Sheets

AUTOSTEREOSCOPIC IMAGE APPARATUS

BACKGROUND OF THE INVENTION

1. Field of the Invention

The invention relates to an autostereoscopic image apparatus and, more particularly, to an autostereoscopic image apparatus which can optically transmit an autostereoscopic image by using what is called an integral photography (IP) technique.

2. Description of Related Art

In a conventional apparatus for transmitting a stereoscopic image, generally, an image for the left eye and an image for the right eye which have a binocular parallax are independently transmitted by using a transmitting system such as a coaxial cable or an optical fiber. Even in a multiple-lens autostereoscopic system, generally, an image corresponding to each eye is independently transmitted. Further, in those transmitting methods, usually, the image corresponding to each eye is once converted into an electric signal and is directly transmitted as an electric signal or it is again converted from the electric signal to a photosignal and is transmitted.

On the other hand, as one of autostereoscopic image systems in which an autostereoscopic image can be freely seen from an arbitrary sight point, what is called an integral photography (IP) using a group of convex lenses or a group of pin holes arranged in a plane shape is known. The IP system will now be described hereinbelow.

First, as shown in FIG. 9, a photograph film 3 is put behind a lens group 2 comprising a plurality of convex lenses $2_1$, $2_2$, . . . , and $2_n$ arranged on the same plane and a photographing object 1 disposed in front of the lens group 2 is photographed. Images $3_1$, $3_2$, . . . , and $3_n$ of the object 1 are formed by the convex lenses $2_1$, $2_2$, . . . , and $2_n$ and are photographed, respectively. Subsequently, a photograph which was photographed and developed is arranged at the same position as that of the film when it is photographed for the lens group 2. By seeing the image on the photograph from the position in front of the lens group 2 in this state, an autostereoscopic image can be seen.

The IP system, however, has problems to be improved. FIG. 10 shows a state where a portion near the lens group in the IP system is seen from the top. An image at an object point O1 is formed at a position of P1 by a convex lens L(n) in the lens group. In this case, on the image forming plane, the image lies within a diameter serving as an image pickup region of the convex lens L(n) in the lens group. On the other hand, an image at an object point O2 is formed at a position of P2 by the same convex lens L(n). In this case, the image is formed within a diameter of an adjacent convex lens L(n+1). Further, an image at an object point O3 is formed at a position of P3 by the convex lens L(n+1). The image at the object point O2 and an optical image at the object point O3 overlap and interfere, so that an inconvenience occurs.

Further, a false image in which the convex and concave states are reversed is seen according to the above IP method. Therefore, in order to invert the autostereoscopic image in which the concave shape has been reversed to the convex shape to a normal autostereoscopic image, some means is necessary.

JP-A-9-43539 discloses a 3-dimensional image display apparatus having a lens array in which a plurality of radial type refractive index distributing type lenses are 2-dimensionally arranged so that their optical axes are parallel. It has been described there that by using such a lens array, an autostereoscopic image display apparatus in which lens graininess becomes inconspicuous and good performance is obtained can be easily manufactured. However, drawbacks peculiar to the IP method cannot be solved.

As mentioned above, according to the system in which the image corresponding to each eye is independently transmitted, the transmitting systems as many as only the number of eyes are necessary and a scale of the transmitting system apparatus enlarges. Further, in case of once converting the image corresponding to each eye to the electric signal, the transmitting system apparatus further becomes complicated.

On the other hand, the IP method is a technique which was inherently invented for the purpose of a recording and reproducing method of an autostereoscopic image using a photographic dry plate. If an optical transmission path which is determined by the distance from the principal plane of the convex lens formed in an array shape to the focal plane can be made long, autostereoscopic information can be transmitted. In this case, however, an F value of the lens becomes extremely large and the resolution deteriorates, so that it is actually difficult to realize such a long optical transmission path. Therefore, a normal autostereoscopic image cannot be reproduced on the image receiving side and converting means is additionally necessary. Even if the focal distance of the lens is merely extended, the size of autostereoscopic image cannot be enlarged or reduced and the transmitting system cannot be freely bent as well.

SUMMARY OF THE INVENTION

It is an object of the invention to solve the above conventional problems and to realize an autostereoscopic image apparatus which can optically transmit a stereoscopic image.

To accomplish the above object, according to the first aspect of the invention, there is provided an autostereoscopic image apparatus having an assembly of a plurality of optical fibers having a lens function. A length of each of a plurality of optical fibers is equal to a length that is integer times as long as a length corresponding to one period of a serpentine run of the optical path in the optical fiber. The first edge surface of each of a plurality of optical fibers is located on the same plane and forms the first edge surface of the assembly. The second edge surface of each of a plurality of optical fibers is located on the same plane and forms the second edge surface of the assembly. There is a mirror image relation between a 2-dimensional arrangement of the second edge surface of the assembly and a 2-dimensional arrangement of the first edge surface of the assembly. In the assembly, an object is picked-up at the first edge surface, the picked-up image is transmitted to the second edge surface, and the photographed image is displayed on the second edge surface.

According to the second aspect of the invention, there is provided an autostereoscopic image apparatus comprising: a first assembly of a plurality of optical fibers having a lens function, in which the first edge surface of each of a plurality of optical fibers of the first assembly is located on the same plane and forms the first edge surface of the first assembly, the second edge surface of each of a plurality of optical fibers of the first assembly is located on the same plane and forms the second edge surface of the first assembly, there is a mirror image relation between a 2-dimensional arrangement of the second edge surface of the first assembly and a 2-dimensional arrangement of the first edge surface of the first assembly, and an image of parallel light entering the first edge surface is formed on the second edge surface; an optical system, arranged at the second edge surface of the first assembly, for receiving the formed image and performing one of an enlargement, a reduction, and a rotation of the image; and a second assembly of a plurality of optical fibers having a lens function, in which the first edge surface of each of a plurality of optical fibers of the second assembly is located on the same plane and forms the first edge surface of the second assembly, the second edge surface of each of a plurality of optical fibers of the second assembly is located on the same plane and forms the second edge surface of the second assembly, there is a mirror image relation between a 2-dimensional arrangement of the second edge surface of the second assembly and a 2-dimensional arrangement of the first edge surface of the second assembly, and an image outputted from the optical system is received at the first edge surface and is formed on the second edge surface. The total of a length of each of a plurality of optical fibers of the first assembly and a length of each of a plurality of optical fibers of the second assembly is equal to a length that is integer times as long as a length corresponding to one period of a serpentine run of an optical path in the optical fiber.

Further, according to the third aspect of the invention, there is provided a stereoscopic image apparatus tus comprising: a first assembly of a plurality of optical fibers having a lens function, in which the first edge surface of each of a plurality of optical fibers of the first assembly is located on the same plane and forms the first edge surface of the first assembly, the second edge surface of each of a plurality of optical fibers of the first assembly is located on the same plane and forms the second edge surface of the first assembly, there is a mirror image relation between a 2-dimensional arrangement of the second edge surface of the first assembly and a 2-dimensional arrangement of the first edge surface of the first assembly, and an image of parallel light entering the first edge surface is formed on the second edge surface; a light amplifying apparatus, arranged at the second edge surface of the first assembly, for receiving the formed image and increasing a light amount; and a second assembly of a plurality of optical fibers having a lens function, in which the first edge surface of each of a plurality of optical fibers of the second assembly is located on the same plane and forms the first edge surface of the second assembly, the second edge surface of each of a plurality of optical fibers of the second assembly is located on the same plane and forms the second edge surface of the second assembly, there is a mirror image relation between a 2-dimensional arrangement of the second edge surface of the second assembly and a 2-dimensional arrangement of the first edge surface of the second assembly, and an image outputted from the light amplifying apparatus is received at the first edge surface and is formed on the second edge surface. The total of a length of each of a plurality of optical fibers of the first assembly and a length of each of a plurality of optical fibers of the second assembly is equal to a length that is integer times as long as a length corresponding to one period of a serpentine run of an optical path in the optical fiber.

DETAILED DESCRIPTION OF THE PREFERRED EMBODIMENTS

An embodiment of the invention will now be described hereinbelow with reference to the drawings.

Figure 1:
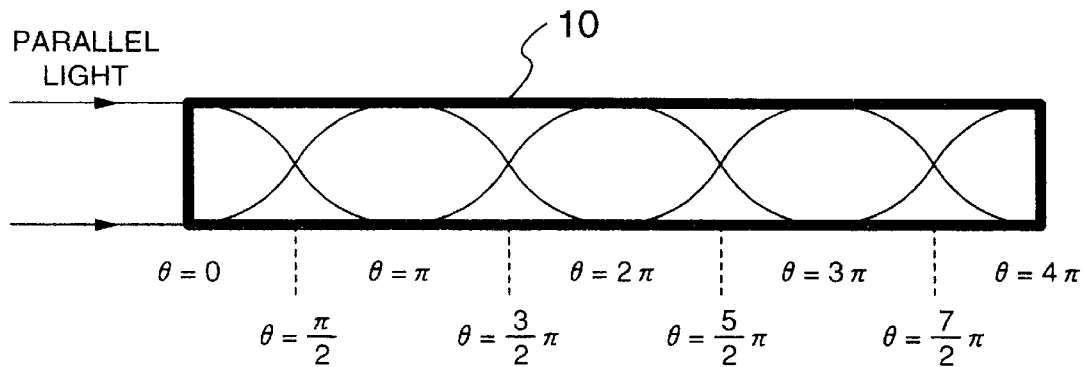
FIG. 1 is a diagram for explaining a setting principle of a length of each optical fiber which is used in an autostereoscopic image apparatus of the first embodiment of the invention.
Figure 2A:
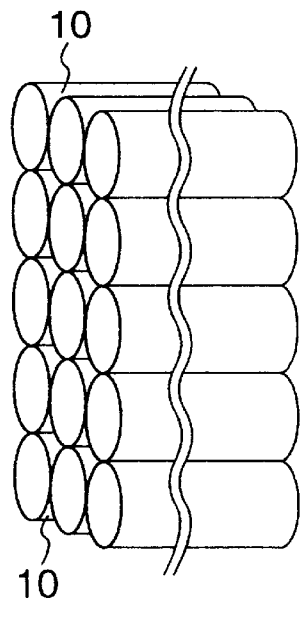
FIGS. 2A and 2B are schematic perspective views showing parts of the autostereoscopic image apparatus according to the invention.
Figure 2B:
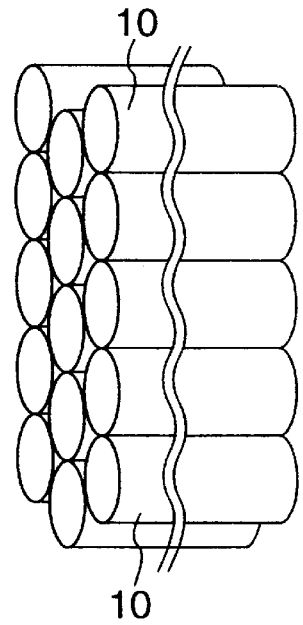

According to the first embodiment of the invention, a length of each of a plurality of optical fibers 10 having a lens function by possessing an uneven refractive index distribution like, for example, square characteristics in the radial direction is set to the same length that is integer times as long as a length corresponding to one period corresponding to a serpentine run of an optical path as shown in FIG. 1. As shown in FIG. 2A or 2B, such a plurality of optical fibers 10 are arranged so that their edge surfaces at both edges of each optical fiber are aligned on the same plane. In this instance, they are arranged so as to obtain a mirror image relation between the 2-dimensional arrangements at both edge surfaces of each optical fiber. It is desirable that the refractive index distributions of all of the optical fibers are equal. By arranging a plurality of optical fibers as mentioned above, an autostereoscopic image picked-up on one edge side can be transmitted to the other edge in a form of light and can be displayed on the other edge side.

Figure 3:
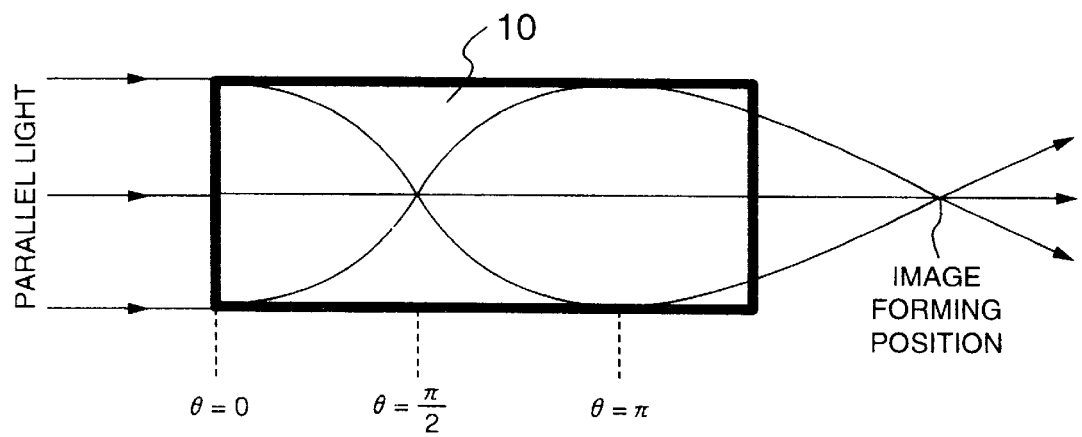
FIG. 3 is a diagram showing a serpentine run in the optical fiber.

As an example in which a refractive index of the glass fiber is high in the center portion in the radial direction and decreases as the position approaches the peripheral portion, there is an optical fiber having the following characteristics:

$$n = n_0 \, \text{sech}(\sqrt{A}r) = n_0 \left\{ 1 - \frac{A}{2}r^2 + \frac{5}{6}\left(\frac{A}{2}\right)^2 r^4 - \ldots \right\} \quad (1)$$

$$\approx n_0 \cdot \left(1 - \frac{A}{2}r^2\right)$$

where, n: refractive index at a radius r
$n_0$: refractive index at the center
A: constant which is determined by the material of the optical fiber
r: radius When light enters the optical fiber, since the refractive index is higher as the position is close to the center portion, the light runs in a serpentine manner as shown in FIG. 3 and an image is formed at a certain specific point, so that the optical fiber has a lens function. This principle has been devised by D. Marcuse et al. in 1964 and its details are disclosed in "The Bell System Technical Journal", July, 1964. The disclosure of that document is incorporated herein by reference.

Conditions in which the image forming position is located at an emission edge surface are as follows:

$$\theta = \sqrt{A} Z_0 = \pi/2, 3\pi/2, \ldots, \pi/2(2m+1) \quad (2)$$

where, m: integer of 0 or more $Z_0$: length of optical fiber

Moreover, for instance, when a value of $\theta$ lies within ranges from $\pi$ to $2\pi$, from $3\pi$ to $4\pi$, from $5\pi$ to $6\pi$, ..., the light emitted from a photographing object existing at an enough remote position from the optical fiber passes through the optical fiber, so that an erect image is formed (refer to FIG. 3). Therefore, in place of a 2-dimensional array of a spherical lens, by arranging predetermined optical fibers having an uneven refractive index distribution such as square characteristics in the radial direction so that their edge surfaces have a 2-dimensional arrangement and by photographing a motion image by the IP method, an optical image to be formed can be set to an erect image. Publication JP-A-10-150675 of Japanese Patent Application which has already been filed by some of the inventors of the present invention is incorporated herein by reference.

Figure 4:
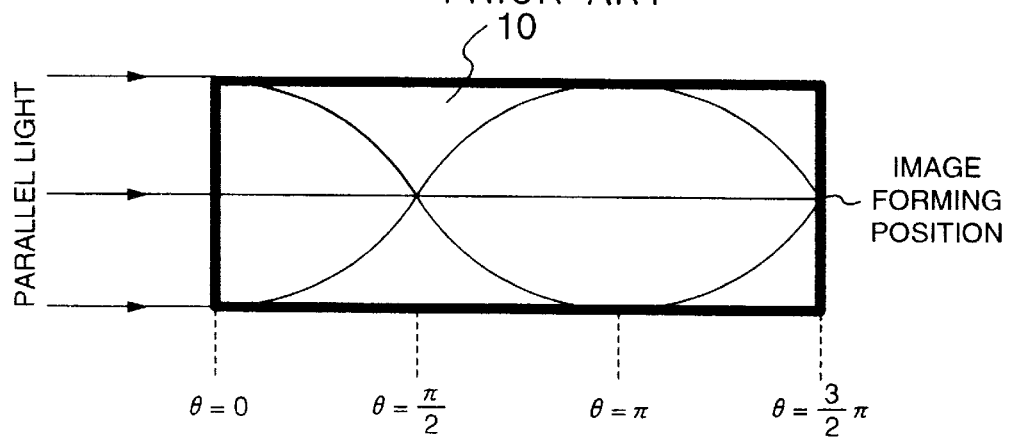
FIG. 4 is a diagram showing the operation of an optical fiber in an autostereoscopic image apparatus according to JP-A-10-150675.

In JP-A-10-150675, in order to set the optical fiber length so that the image forming position is located at the emission edge surface of the optical fiber, as shown in FIG. 4, the optical fiber length $Z_0$ is set to a length which satisfies the following equation:

$$\theta = \sqrt{A} Z_0 = 3\pi/2 \quad (3)$$

By setting as mentioned above, an image of the object existing at an enough far position is formed almost at the optical fiber emission edge surface. Therefore, a size of this formed optical image is not larger than the size of emission edge surface. Thus, in a manner similar to FIG. 2A or 2B, even if a lens group is formed by arranging those optical fibers so that their edge surfaces are 2-dimensionally arranged, the optical images which are formed at the optical fiber edge surfaces are not mutually interfered and an effect such that an optical barrier is substantially provided between the lenses is derived. Since the erect image is obtained at the optical fiber edge surface, by using a convex lens on the display side, a correct autostereoscopic image instead of a false image having the reversed concave and convex states can be reproduced.

Further, in JP-A-10-150675, the convex lens on the reproducing side is constructed by optical fibers in a manner similar to the image pickup side and the optical fiber length $Z_0$ is set to a length which satisfies the following equation:

$$\theta = \sqrt{A} Z_0 = \pi/2 \quad (4)$$

That is, by setting the optical fiber length to $\theta = 3\pi/2$ on the image pickup side and to $\theta = \pi/2$ on the display side, an autostereoscopic image is picked-up and displayed. Even by setting the optical fiber length to $\theta = \pi/2$ on the image pickup side and to $\theta = 3\pi/2$ on the display side, an autostereoscopic image can be also similarly picked-up and displayed. Although a transmitting portion using an electric signal can be also provided between the image pickup portion and the display portion, the image pickup portion, transmitting portion, and display portion are integrated by using the optical fibers in the embodiment.

As will be obviously understood from the above example, the optical fiber length $Z_0$ in case of integrating the image pickup portion, transmitting portion, and display portion is set to a length which satisfies the following equation:

$$z_0 = \frac{\theta}{\sqrt{A}} = \frac{1}{\sqrt{A}} 2(n+1)\pi \quad (5)$$

where, n: integer of 0 or more

By arranging the above optical fibers as shown in FIG. 2A or 2B, an autostereoscopic image can be directly observed on the emission edge surface side of the optical fibers. When n=0, the same conditions as those in which the optical fiber length $Z_0$ is set to $\theta = 3\pi/2$ on the image pickup side and to $\theta = \pi/2$ on the display side or it is set to $\theta = \pi/2$ on the image pickup side and to $\theta = 3\pi/2$ on the display side are obtained, and the image pickup and the display of the autostereoscopic image can be simultaneously performed. In the invention, by setting n to a large number, that is, by setting the optical fiber length to a long length, the optical image as much as only an amount of such a long optical fiber length can be transmitted. As a result, an autostereoscopic image apparatus in which the image pickup portion, transmitting portion, and display portion are integrated can be eventually constructed.

Figure 5:
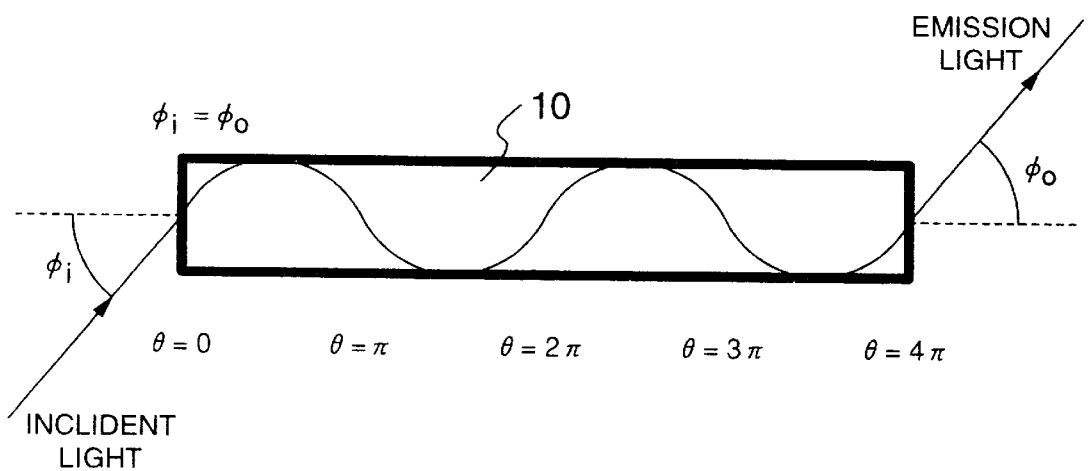
FIG. 5 is a diagram showing incident light and emission light of an optical fiber which is used in an autostereoscopic image apparatus according to the invention.
Figure 6:
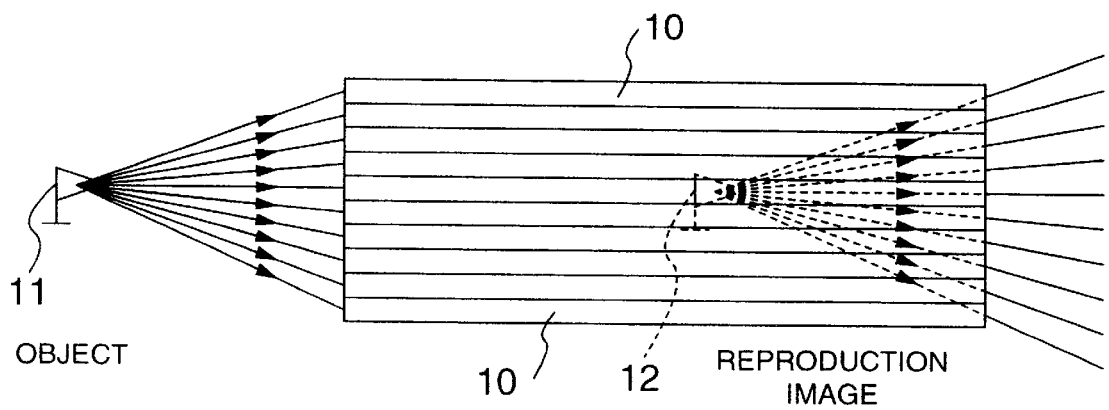
FIG. 6 is a diagram showing a state where a reproduction autostereoscopic image is obtained by the autostereoscopic image apparatus according to the first embodiment of the invention.

This point will now be described in detail hereinbelow. When the optical fiber length satisfies the equation (5), as shown in FIG. 5, there is a nature such that an angle $\phi_i$ between the incident light and the optical axis of the optical fiber is equal to an angle $\phi_o$ between the emission light and the optical axis of the optical fiber. FIG. 6 shows incident light and emission light with respect to optical fibers of one array in case of arranging a plurality of such optical fibers so that their edge surfaces are located on the same plane. As shown in FIG. 6, the direction of the light from a picking-up object 11 at the incident edge surface is reconstructed at the emission edge surface (a reference numeral 12 denotes an image of the object formed in the optical fiber). On the emission edge surface side, therefore, a reproduction image is obtained at the same distance as that from the incident edge to the object and at the same size as that of the object. Actually, a plurality of optical fibers are arranged as described in FIG. 2A or 2B.

The second embodiment of the invention will now be described with reference to FIG. 7. In the embodiment, an enlargement optical system 30 is provided between an optical fiber 10A of the image pickup portion and an optical fiber 10B of the display portion.

It is shown that an optical system 30 such as an enlargement optical system is inserted in a plane where the optical fiber length $Z_0$ of the image pickup portion satisfies the following equation:

$$\theta = \pi/2 + k\pi \quad (6)$$

where, k: integer of 0 or more

Figure 7:
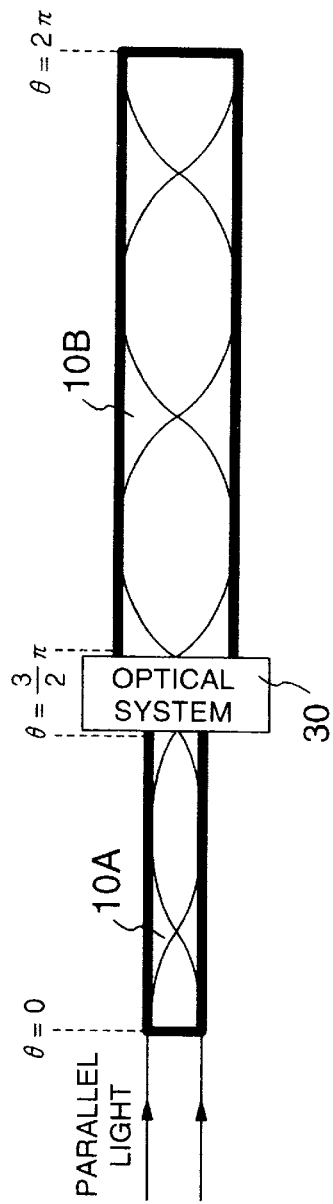
FIG. 7 is a diagram showing an autostereoscopic image apparatus according to the second embodiment of the invention.

By inserting the enlargement optical system in the plane where an image is formed in the optical fiber 10A in the case where parallel light enters the optical fiber 10A as shown in FIG. 7, the size of reproduction autostereoscopic image can be enlarged as compared with that of the object. In this case, as an optical fiber 10B on the side where the enlarged autostereoscopic image is displayed, an optical fiber having a diameter according to an enlargement coefficient is used against the optical fiber 10A on the input side. On the other hand, by inserting a reduction optical system as the optical system 30, the reproduction stereoscopic image can be reduced. In this case, an optical fiber having a diameter smaller than the optical fiber 10A on the input side is used as an optical fiber 10B for displaying. As an enlargement optical system and a reduction optical system, there is a fiber optic plate (made by Hamamatsu Photonics Co., Ltd. in Japan, INCOM Co., Ltd. in U.S.A.) or the like. The total length of the optical fiber of the autostereoscopic image apparatus, that is, the sum of the length of the optical fiber 10A on the input side and the length of the optical fiber 10B on the display side needs to satisfy the equation (5). For convenience of explanation, in FIG. 7, only one optical fiber has been shown as each of the optical fibers on the input side and display side. Actually, each of the optical fibers on the input side and transmitting and display side is made up of an assembly of a plurality of optical fibers, respectively, in a manner similar to those described in FIG. 2A or 2B. Further, the autostereoscopic image can be rotated by inserting an optical system for rotating the formed image (for example, made by INCOM Co., Ltd. in U.S.A.) as the optical system 30.

Figure 8:
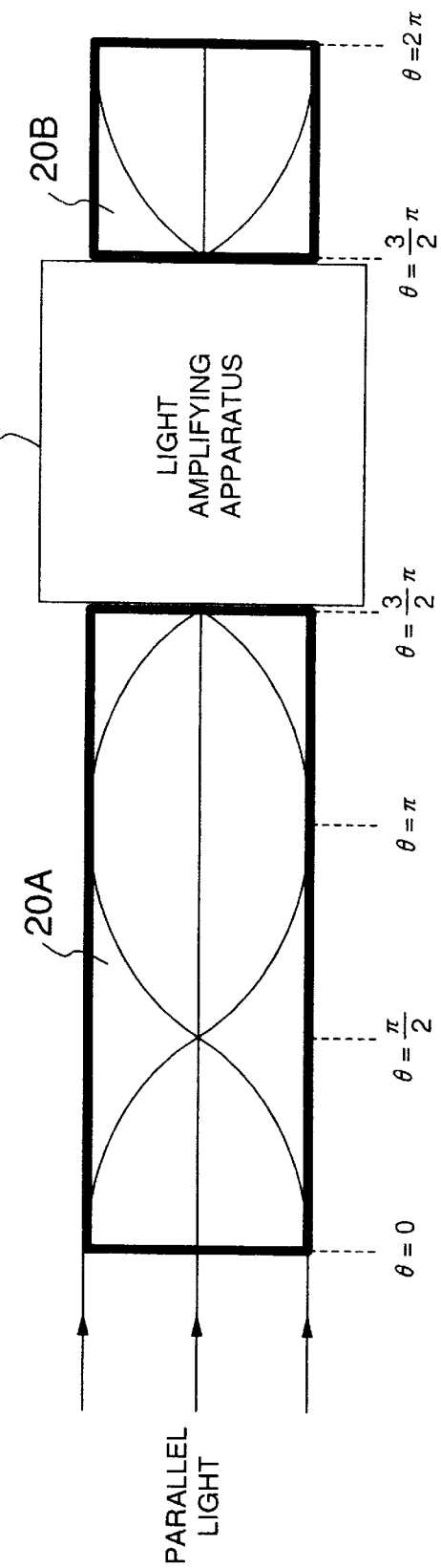
FIG. 8 is a diagram showing an autostereoscopic image apparatus according to the third embodiment of the invention.
Figure 9:
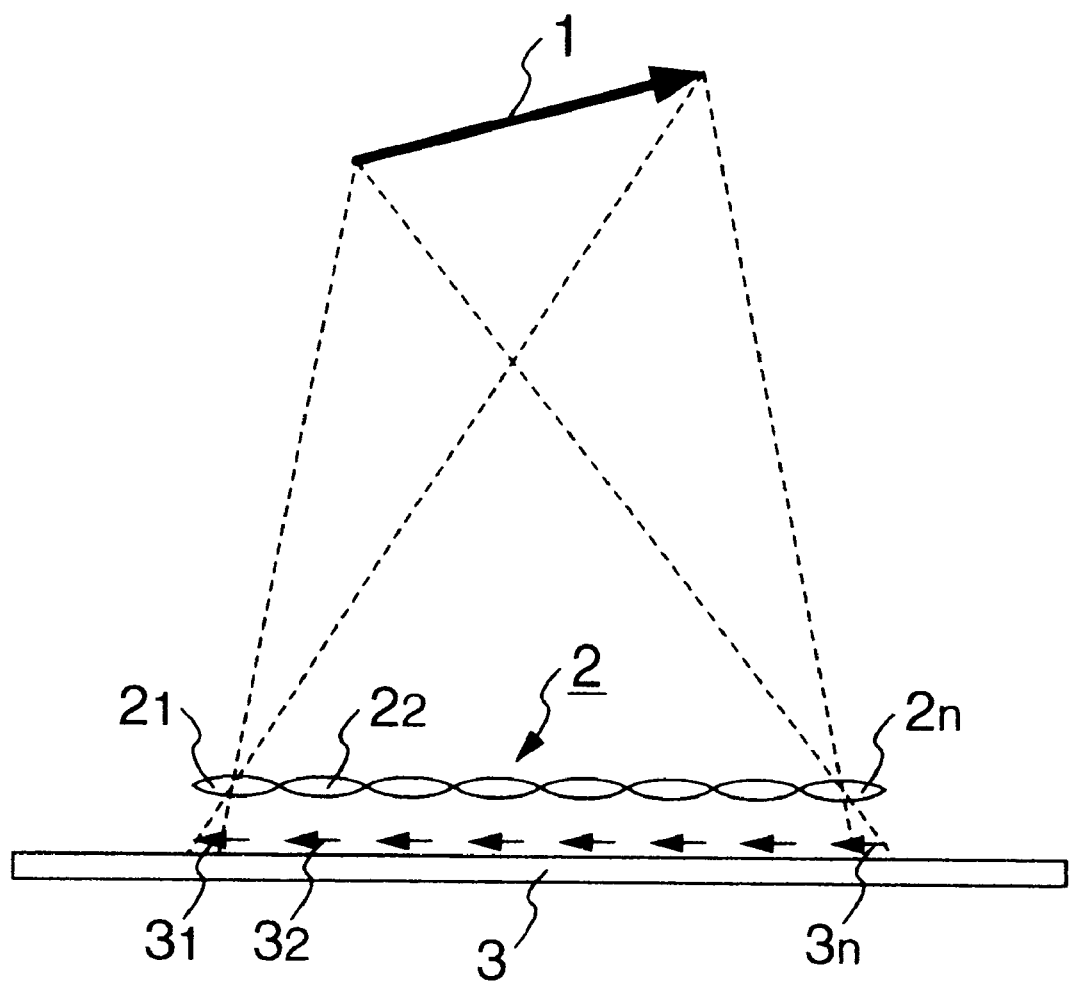
FIG. 9 is a diagram for explaining the operation of the conventional autostereoscopic image apparatus.
Figure 10:
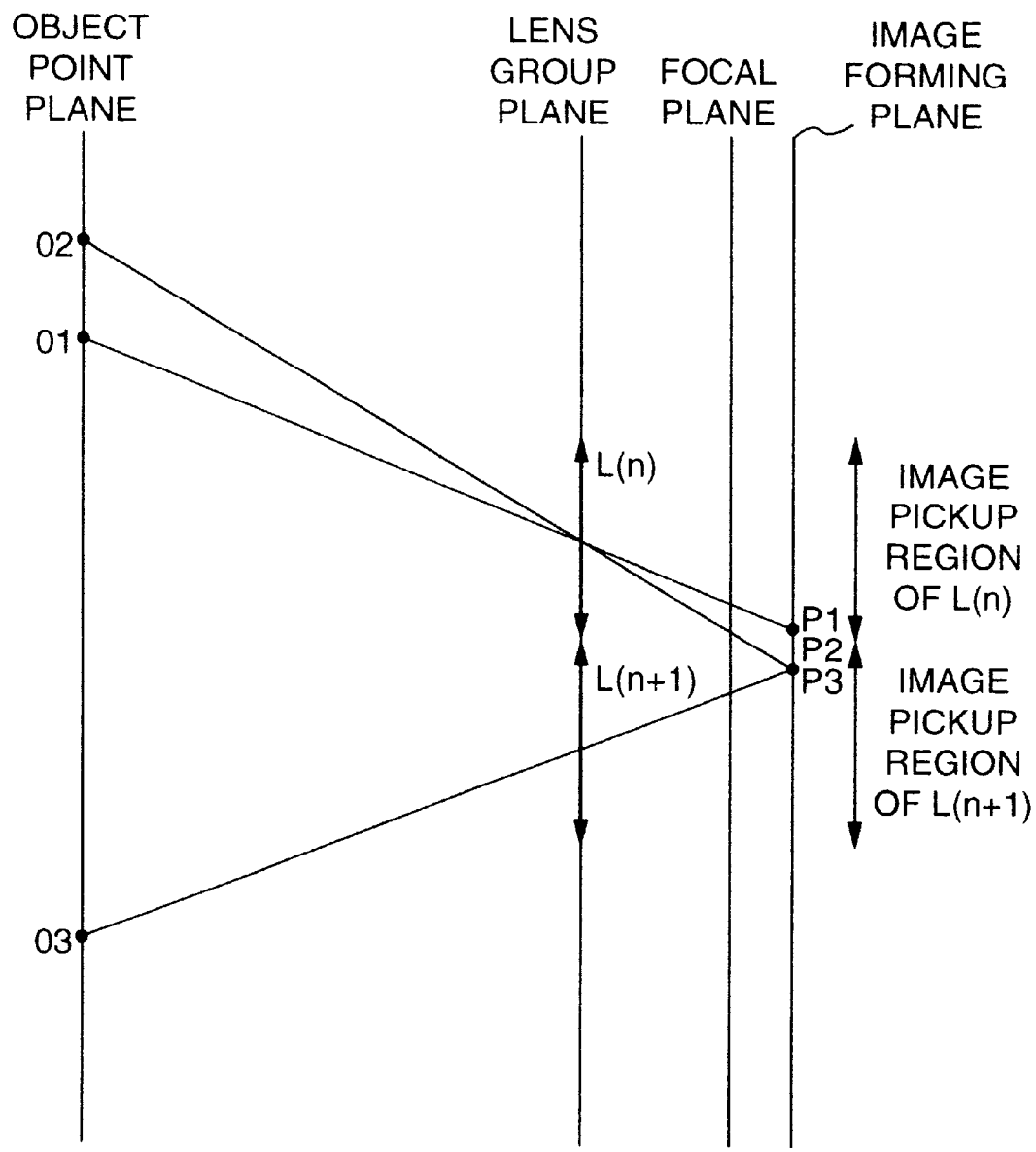
FIG. 10 is a diagram showing a portion near a lens of the conventional stereoscopic image apparatus.

The third embodiment of the invention will now be described with reference to FIG. 8. In the embodiment, a light amplifying apparatus 40 is provided between the optical fiber 20A of the image pickup portion and the optical fiber 20B of the display portion. The light amplifying apparatus 40 can be also used in combination with the foregoing second embodiment. Thus, the brightness of a display image can be amplified or the reduction of the brightness due to a transmission loss can be supplemented.

According to the invention as described above, by the IP system, an autostereoscopic image can be transmitted at a long distance without enlarging the scale of the optical transmission path and without converting the light to an electric signal. Further, by manufacturing the optical fiber so that it can be bent, the transmission path of the autostereoscopic image of the invention can be also bent. The autostereoscopic image can be also enlarged, reduced, or rotated by inserting the enlargement optical system, reduction optical system, or rotation optical system to a specific location of the optical fibers constructing the autostereoscopic image apparatus of the invention. Further, by inserting the light amplifying device, the brightness of the display image can be amplified or the reduction of the brightness due to the transmission loss can be supplemented. The autostereoscopic image apparatus according to the invention, therefore, can be applied as an endoscope, a borescope, or the like which provides an autostereoscopic image.

What is claimed is:

1. An autostereoscopic image apparatus comprising an assembly of a plurality of optical fibers having a lens function, wherein:
   a length of each of said plurality of optical fibers is equal to a length that is integer times as long as a length corresponding to one period of a serpentine run of an optical path in said optical fiber;
   a first edge surface of each of said plurality of optical fibers is located on a same plane and forms a first edge surface of said assembly;
   a second edge surface of each of said plurality of optical fibers is located on a same plane and forms a second edge surface of said assembly;
   there is a mirror image relation between a 2-dimensional arrangement of the second edge surface of said assembly and a 2-dimensional arrangement of the first edge surface of said assembly; and
   said assembly picks-up an image of an object at the first edge surface, transmits the picked-up image to the second edge surface, and displays the picked-up image at the second edge surface.

2. An apparatus according to claim 1, wherein each of said plurality of optical fibers has a refractive index distribution in which a refractive index increases from a peripheral portion toward a center portion.

3. An apparatus according to claim 2, wherein each of said plurality of optical fibers has a refractive index distribution that can be approximated by a function of a square of a radius.

4. An autostereoscopic image apparatus comprising:
   a first assembly of a plurality of optical fibers having a lens function, in which a first edge surface of each of said plurality of optical fibers of said first assembly is located on a same plane and forms a first edge surface of said first assembly, a second edge surface of each of said plurality of optical fibers of said first assembly is located on a same plane and forms a second edge surface of said first assembly, there is a mirror image relation between a 2-dimensional arrangement of the second edge surface of said first assembly and a 2-dimensional arrangement of the first edge surface of said first assembly, and an image of parallel light entering the first edge surface is formed on the second edge surface;
   an optical system, arranged at the second edge surface of said first assembly, for receiving the formed image and performing one of an enlargement, a reduction, and a rotation of the image; and
   a second assembly of a plurality of optical fibers having a lens function, in which a first edge surface of each of said plurality of optical fibers of said second assembly is located on a same plane and forms a first edge surface of said second assembly, a second edge surface of each of said plurality of optical fibers of said second assembly is located on a same plane and forms a second edge surface of said second assembly, there is a mirror image relation between a 2-dimensional arrangement of the second edge surface of said second assembly and a 2-dimensional arrangement of the first edge surface of said second assembly, and an image outputted from said optical system is received at the first edge surface and is formed on the second edge surface;
   wherein a total of a length of each of said plurality of optical fibers of said first assembly and a length of each of said plurality of optical fibers of said second assembly is equal to a length that is integer times as long as a length corresponding to one period of a serpentine run of an optical path in said optical fiber.

5. An apparatus according to claim 4, wherein each of said plurality of optical fibers of said first and second assemblies has a refractive index distribution in which a refractive index increases from a peripheral portion toward a center portion.

6. An apparatus according to claim 5, wherein each of said plurality of optical fibers of said first and second assemblies has a refractive index distribution that can be approximated by a function of a square of a radius.

7. An autostereoscopic image apparatus comprising:
   a first assembly of a plurality of optical fibers having a lens function, in which a first edge surface of each of said plurality of optical fibers of said first assembly is located on a same plane and forms a first edge surface of said first assembly, a second edge surface of each of said plurality of optical fibers of said first assembly is located on a same plane and forms a second edge surface of said first assembly, there is a mirror image relation between a 2-dimensional arrangement of the second edge surface of said first assembly and a 2-dimensional arrangement of the first edge surface of said first assembly, and an image of parallel light entering the first edge surface is formed on the second edge surface;

a light amplifying apparatus, arranged at the second edge surface of said first assembly, for receiving the formed image and increasing a light amount; and a second assembly of a plurality of optical fibers having a lens function, in which a first edge surface of each of said plurality of optical fibers of said second assembly is located on a same plane and forms a first edge surface of said second assembly, a second edge surface of each of said plurality of optical fibers of said second assembly is located on a same plane and forms a second edge surface of said second assembly, there is a mirror image relation between a 2-dimensional arrangement of the second edge surface of said second assembly and a 2-dimensional arrangement of the first edge surface of said second assembly, and an image outputted from said light amplifying apparatus is received at the first edge surface and is formed on the second edge surface;

wherein a total of a length of each of said plurality of optical fibers of said first assembly and a length of each of said plurality of optical fibers of said second assembly is equal to a length that is integer times as long as a length corresponding to one period of a serpentine run of an optical path in said optical fiber.

8. An apparatus according to claim 7, wherein each of said plurality of optical fibers of said first and second assemblies has a refractive index distribution in which a refractive index increases from a peripheral portion toward a center portion.

9. An apparatus according to claim 8, wherein each of said plurality of optical fibers of said first and second assemblies has a refractive index distribution that can be approximated by a function of a square of a radius.

* * * * *